July 28, 1925.

A. E. JONES

AUTOMOBILE TORPEDO

Filed March 21, 1924

1,547,329

Inventor
Albert Edward Jones
By
Pennie, Davis, Marvin & Edmonds
Attorneys

Patented July 28, 1925.

1,547,329

UNITED STATES PATENT OFFICE.

ALBERT EDWARD JONES, OF WESTMINSTER, LONDON, ENGLAND, ASSIGNOR TO THE WHITEHEAD TORPEDO COMPANY LIMITED, OF WESTMINSTER, ENGLAND.

AUTOMOBILE TORPEDO.

Application filed March 21, 1924. Serial No. 700,754.

*To all whom it may concern:*

Be it known that I, ALBERT EDWARD JONES, a subject of the King of Great Britain, residing at 8 Great George Street, Westminster, in the county of London, England, have invented certain new and useful Improvements in Automobile Torpedoes, of which the following is a specification.

This invention relates to automobile torpedoes and has for its object to provide improved means for connecting together the different lengths or sections of which a torpedo shell is composed.

According to the invention two abutting shell sections are held together by means of a screw threaded ring which engages with screw threads on the end of one shell section (or on a member attached thereto) and which has a part bearing against a part at the end of the other shell section so that when said ring is angularly displaced in the correct direction the two shell sections are drawn tightly together. The engaging parts of the ring and the second shell section are preferably constituted by projections extending through a comparatively small arc of a circle with gaps between them of slightly greater arcuate length, so that detachment can be effected by a small angular displacement of the said ring. This angular displacement is preferably effected by means of pinions which are arranged diametrically opposite each other and which engage with rack teeth on the face of the ring.

In order that the said invention may be clearly understood and readily carried into effect the same will be more fully described with reference to the accompanying drawings in which:—

Figure 2:
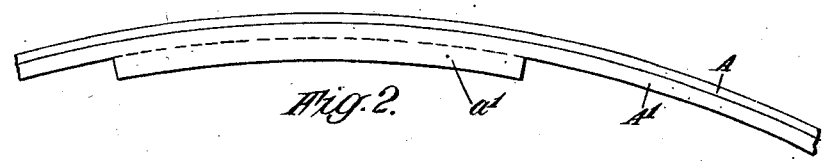
Figure 2 is an end elevation of part of the second shell section.
Figure 3:
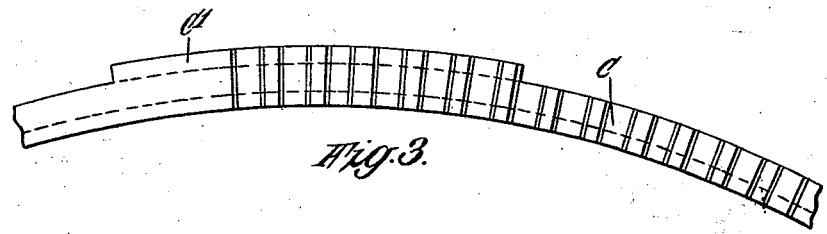
Figure 3 is an end elevation of part of the aforesaid ring.
Figure 4:
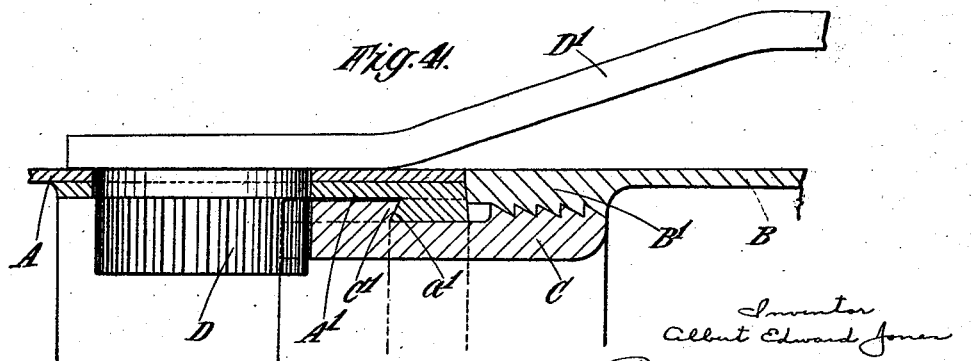
Figure 4 is a view similar to Figure 1 of a modified construction.

In the example shewn A is part of the engine room shell section and B is part of the after-body shell section. $A^1$ is a member fixed to the shell section A and $B^1$ is an extension member fixed to or made integral with the shell section B and formed with external screw threads (Figures 1 to 3) or internal screw threads (Figure 4). C is the screw threaded ring which engages with the screw threads on the member $B^1$ and which has projections $C^1$ extending through comparatively small arcs of a circle with gaps between them of slightly greater arcuate length. The member $A^1$ has similar projections $a^1$ with which the projections $C^1$ cooperate when the ring C is tightened, to force the sections A and B together. When the ring C is slackened off, the projections $C^1$ thereon come opposite the gaps between the projections $a^1$ on the member $A^1$ (at which time the projections $a^1$ are also opposite the gaps between the projections $C^1$) and the shell sections can then be pulled apart. The screw threads on the ring C and on the extension member $B^1$ are preferably of buttress formation as shewn, and the cooperating surfaces of the aforesaid projections $C^1$, $a^1$ are preferably slightly inclined from the vertical as shewn in Figures 1 and 4 so as to avoid any tendency for the member $A^1$ to be forced outwards radially during the tightening operation of the ring C.

Figure 1:
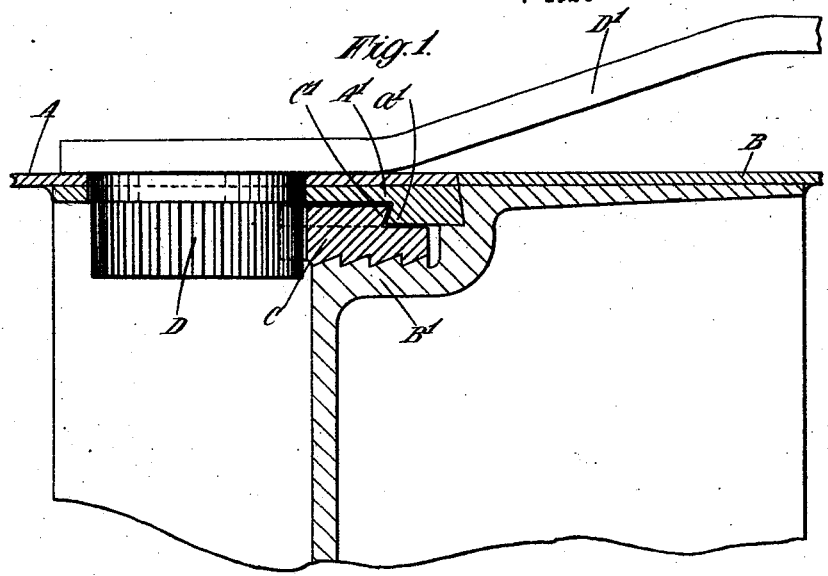
Figure 1 is a local section shewing one constructional form of the invention.

The forward face of the ring C has rack teeth with which engage pinions arranged diametrically opposite each other, one of these pinions being indicated at D in Figure 1. These pinions preferably have handles $D^1$ and are placed in position through holes in the shell section A. The spanners thus formed by the pinions and handles are removed when the shell sections have been forced together and if desired the holes may be closed by suitable plates or plugs. It will be understood that the two spanners have to be operated simultaneously owing to the large diameter of the ring C and that the same pair of spanners can be used for all the shell sections that are required to be joined together.

It is found that there is no tendency for the ring C to slacken off once it has been tightened, but if desired a suitable retaining device may be employed.

Stops may be provided for ensuring the proper register of the shell sections that are to be joined together and other stops may be provided for limiting the angular displacement of the ring C in the unlocking direction.

What I claim and desire to secure by Letters Patent of the United States is:—

1. In a torpedo, means for connecting together two shell sections comprising screw threads on part of one shell section, an angularly displaceable member, screw threads on said angularly displaceable member for engaging with the screw threads on the first-mentioned shell section, and coacting projections on said member and on the other shell section, said projections extending through a comparatively small arc of a circle with gaps between them of slightly greater arcuate length.

2. In a torpedo, means for connecting together two shell sections comprising an extension member on one shell section, said member being of smaller diameter than the internal diameter of the shell, screw threads on said member, a screw threaded ring engaging with the screw threads on said member, and co-acting projections on said ring and on the other shell section, said projections extending through a comparatively small arc of a circle with gaps between them of slightly greater arcuate length.

3. In a torpedo, means for connecting together two shell sections comprising an extension member on one shell section, screw threads on said member, a member fixed to the other shell section, an angularly displaceable member bearing against the second-mentioned member, screw threads on said angularly displaceable member for engaging with the screw threads on the first-mentioned member and means for operating said angularly displaceable member from the exterior of the shell.

4. In a torpedo, means for connecting together two shell sections comprising an extension member on one shell section, said member being of smaller diameter than the internal diameter of the shell, screw threads on said member, a member fixed to the other shell section, a screw threaded ring bearing against the latter member and engaging with the screw threads on the former member, rack teeth on the face of said ring and pinions for engaging with said teeth to operate said ring.

5. In a torpedo, means for connecting together two shell sections comprising an extension member on one shell section, said member being of smaller diameter than the internal diameter of the shell, screw threads on said member, a screw threaded ring engaging with the screw threads on said member, and co-acting projections on said ring and on the other shell section, said projections extending through a comparatively small arc of a circle with gaps between them of slightly greater arcuate length, rack teeth on the face of said ring and pinions for engaging with said teeth to operate said ring.

6. In a torpedo, means for connecting together two shell sections comprising an extension member on one shell section, said member being of smaller diameter than the internal diameter of the shell, screw threads on said member, a member fixed to the other shell section, a screw threaded ring bearing against the latter member and engaging with the screw threads on the former member, rack teeth on the face of said ring, removable pinions for engaging with said teeth to operate said ring and handles attached to said pinions for operating them.

7. In a torpedo, means for connecting together two shell sections comprising an extension member on one shell section, said member being of smaller diameter than the internal diameter of the shell, screw threads on said member, a screw threaded ring engaging with the screw threads on said member, and co-acting projections on said ring and on the other shell section, said projections extending through a comparatively small arc of a circle with gaps between them of slightly greater arcuate length, rack teeth on the face of said ring, removable pinions for engaging with said teeth to operate said ring and handles attached to said pinions for operating them.

ALBERT EDWARD JONES.